United States Patent
Masuda et al.

(10) Patent No.: US 11,630,738 B2
(45) Date of Patent: Apr. 18, 2023

(54) AUTOMATIC OBJECTIVE-BASED COMPRESSION LEVEL CHANGE FOR INDIVIDUAL CLUSTERS

(71) Applicant: INTERNATIONAL BUSINESS MACHINES CORPORATION, Armonk, NY (US)

(72) Inventors: Koichi Masuda, Tokyo (JP); Kousei Kawamura, Tokyo (JP); Shinsuke Mitsuma, Tokyo (JP); Ryohta Kawase, Tokyo (JP); Eiji Tosaka, Tokyo (JP); Sosuke Matsui, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 16/393,659

(22) Filed: Apr. 24, 2019

(65) Prior Publication Data
US 2020/0341859 A1 Oct. 29, 2020

(51) Int. Cl.
*G06F 3/06* (2006.01)
*G06F 11/14* (2006.01)

(52) U.S. Cl.
CPC .......... *G06F 11/1464* (2013.01); *G06F 3/065* (2013.01); *G06F 3/067* (2013.01); *G06F 3/0608* (2013.01); *G06F 11/1469* (2013.01)

(58) Field of Classification Search
None
See application file for complete search history.

(56) References Cited

U.S. PATENT DOCUMENTS

| | | | |
|---|---|---|---|
| 8,527,467 B2 | 9/2013 | Shmueli | |
| 9,569,454 B2 | 2/2017 | Ebsen et al. | |
| 9,639,383 B1 | 5/2017 | Natanzon | |
| 9,852,055 B2 | 12/2017 | Arges et al. | |
| 2012/0296883 A1 | 11/2012 | Ganesh et al. | |
| 2015/0169367 A1* | 6/2015 | Falco | G06F 9/544 718/101 |
| 2016/0092407 A1* | 3/2016 | Ball | G06T 1/20 715/202 |
| 2017/0060772 A1 | 3/2017 | Krishnappa et al. | |
| 2017/0123704 A1 | 5/2017 | Sharma et al. | |

OTHER PUBLICATIONS

Mell et al., "The NIST Definition of Cloud Computing," National Institute of Standards and Technology, Sep. 2011, p. 1-3, Special Publication 800-145.

\* cited by examiner

*Primary Examiner* — Grace Park
(74) *Attorney, Agent, or Firm* — Rakesh Roy

(57) ABSTRACT

A method, computer system, and a computer program product for objective-based compression level change is provided. The present invention may include storing a volume in a storage device, wherein the stored volume is compressed using an initial compression level. The present invention may also include checking a last access time of the stored volume in the storage device at a regular interval. The present invention may further include, in response to determining, based on the checked last access time, that the stored volume is not accessed at the regular interval, recompressing the stored volume in the storage device using a higher compression level, wherein the higher compression level includes a higher compression ratio than a compression ratio associated with the initial compression level.

17 Claims, 6 Drawing Sheets

AUTOMATIC OBJECTIVE-BASED COMPRESSION LEVEL CHANGE FOR INDIVIDUAL CLUSTERS

BACKGROUND

The present invention relates generally to the field of computing, and more particularly to storage technology.

With the amount of generated data increasing exponentially, data storage, data accessibility, and data protection have become business priorities. Storage virtualization may enable efficient use of storage capacity and may provide data replication functions in a distributed data processing environment.

SUMMARY

Embodiments of the present invention disclose a method, computer system, and a computer program product for objective-based compression level change. The present invention may include storing a volume in a storage device, wherein the stored volume is compressed using an initial compression level. The present invention may also include checking a last access time of the stored volume in the storage device at a regular interval. The present invention may further include, in response to determining, based on the checked last access time, that the stored volume is not accessed at the regular interval, recompressing the stored volume in the storage device using a higher compression level, wherein the higher compression level includes a higher compression ratio than a compression ratio associated with the initial compression level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
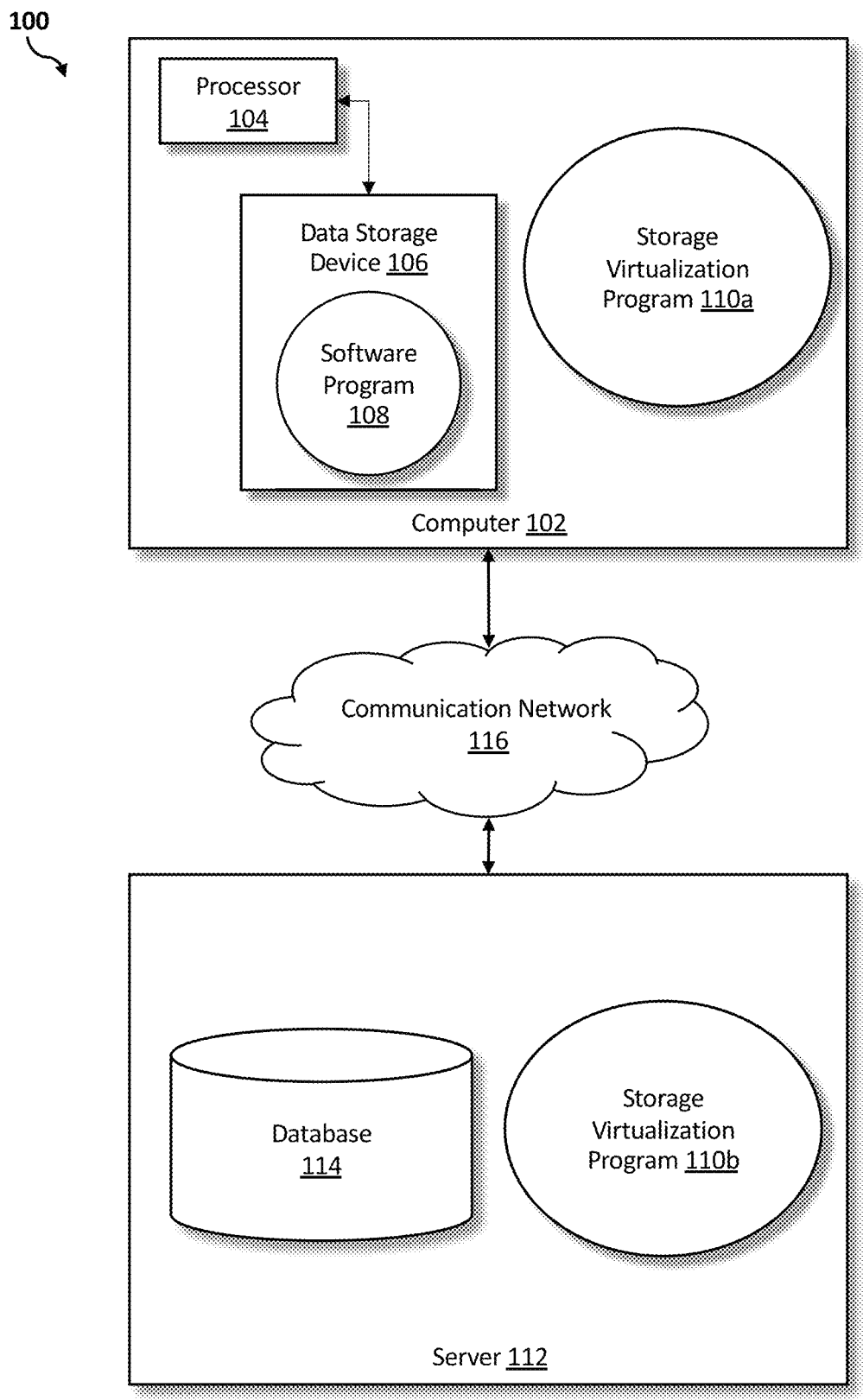
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatic objective-based compression variance of stored data. As such, the present embodiment has the capacity to improve the technical field of storage by automatically changing the compression level of stored data based on the access frequency of the stored data. More specifically, data may be stored initially using a low compression ratio. Then, the last access time of the stored data may be checked at regular intervals. If the stored data was not accessed during the interval, the stored data may be recompressed using a one level higher compression ratio. As this process is repeated, a less frequently accessed data may be stored using a higher compression ratio.

As described previously, with the amount of generated data increasing exponentially, data storage, data accessibility, and data protection have become business priorities. Storage virtualization may enable efficient use of storage capacity and may provide data replication functions in a distributed data processing environment.

Using storage virtualization technology, a virtual tape server (VTS) may reconfigure digital disk drives to emulate the function and operation of physical tape drives. These emulated tape drives, known as virtual tape drives, may be accessed by a host computer at higher speeds when compared to the physical tape drives. The host computer may write data to/read data from the virtual tape drive in the VTS, in the same manner as writing data to/reading data from the physical tape drive. In the virtual tape drive, data may be organized in logical or virtual volumes (volumes).

In order to increase storage efficiency, the VTS may support data compression, and may allow users to select a compression level for each volume written from the host computer. Users may select the compression level based on data characteristics and access frequency. However, it may be difficult to know data characteristics and access frequency before the data is created. As such, preselecting the compression level may be difficult for users and may lead to storage inefficiencies.

Further, each volume may be stored in a production site for high availability purposes and a disaster recovery site for archival purposes. A low compression ratio may be desired in the production site so that the volume may be accessed faster, and a high compression ratio may be desired in the disaster recovery site where storage efficiency is more important than access speed. As such, a static compression level for each volume regardless of the location (e.g., production site or disaster recovery site) may not meet the objectives of one or both of the sites.

Therefore, it may be advantageous to, among another things, provide a way to detect the access frequency of a stored volume and automatically provide a less accessed volume with a high compression level and automatically provide a more accessed volume with a lower compression level.

According to one embodiment, the IBM® (IBM and all IBM-based trademarks and logos are trademarks or registered trademarks of International Business Machines Corporation and/or its affiliates) TS7700 may provide a VTS with tape virtualization capabilities for enterprise storage systems like IBM z Systems® (IBM z Systems and all IBM z Systems-based trademarks and logos are trademarks or registered trademarks of International Business Machines Corporation and/or its affiliates). The TS7700 may support two lossless data compression options: LZ4 and Zstandard (Zstd). Generally, Zstd may achieve a higher compression ratio than LZ4. However, relative to LZ4, Zstd may include a slower compression process and more processing resources may be needed. In other words, LZ4 may achieve a lower compression ratio than Zstd but may include a faster compression process, needing less processing resources. The TS7700 may support a multi-cluster grid configuration with up to eight clusters of TS7700 servers. A first cluster may provide the production site and a second cluster may provide the disaster recovery site.

According to one embodiment, initially, a volume may be written to a TS7700 cluster using a low compression ratio algorithm. A storage virtualization program may check the last access time of the volume at regular intervals and, if it is determined that the volume was not accessed during the regular interval, the storage virtualization program may recompress the volume with a one-level higher compression level (e.g., one-level higher compression level ratio).

According to one embodiment, the storage virtualization program may shift the compression ratio of a volume stored in the production site from a lower compression ratio to a higher compression ratio at a slower rate. On the other hand, the storage virtualization program may shift the compression ratio of a volume stored in the disaster recovery site from a lower compression ratio to a higher compression ratio at a faster rate. Thus, the volume in the production site may be accessed faster, due to a lower compression ratio, while the storage space in the disaster recovery site may be used more efficiently by adopting a higher compression ratio.

According to one embodiment, a storage virtualization program may define the compression levels in multiple stages (e.g., multi-stage compression process) by using parameters of different compression levels and additionally and/or alternatively using another compression algorithm. In at least one embodiment, a ten-stage compression may be implemented, where compression level 1 may correspond to the lowest compression ratio but support the fastest access to the data and compression level 10 may correspond to the highest compression ratio but support slower access to the data.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a storage virtualization program 110a. The networked computer environment 100 may also include a server 112 that is enabled to run a storage virtualization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, a workstation, a mainframe, or any type of computing devices including an operating system, capable of running a program, accessing a network, and accessing a database 114. According to various implementations of the present embodiment, the storage virtualization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the storage virtualization program 110a, 110b (respectively) to automatically vary the compression ratio of a volume stored in multiple clusters based on one or more objectives. The compression ratio variance method is explained in more detail below with respect to FIGS. 2 and 3.

Figure 2:
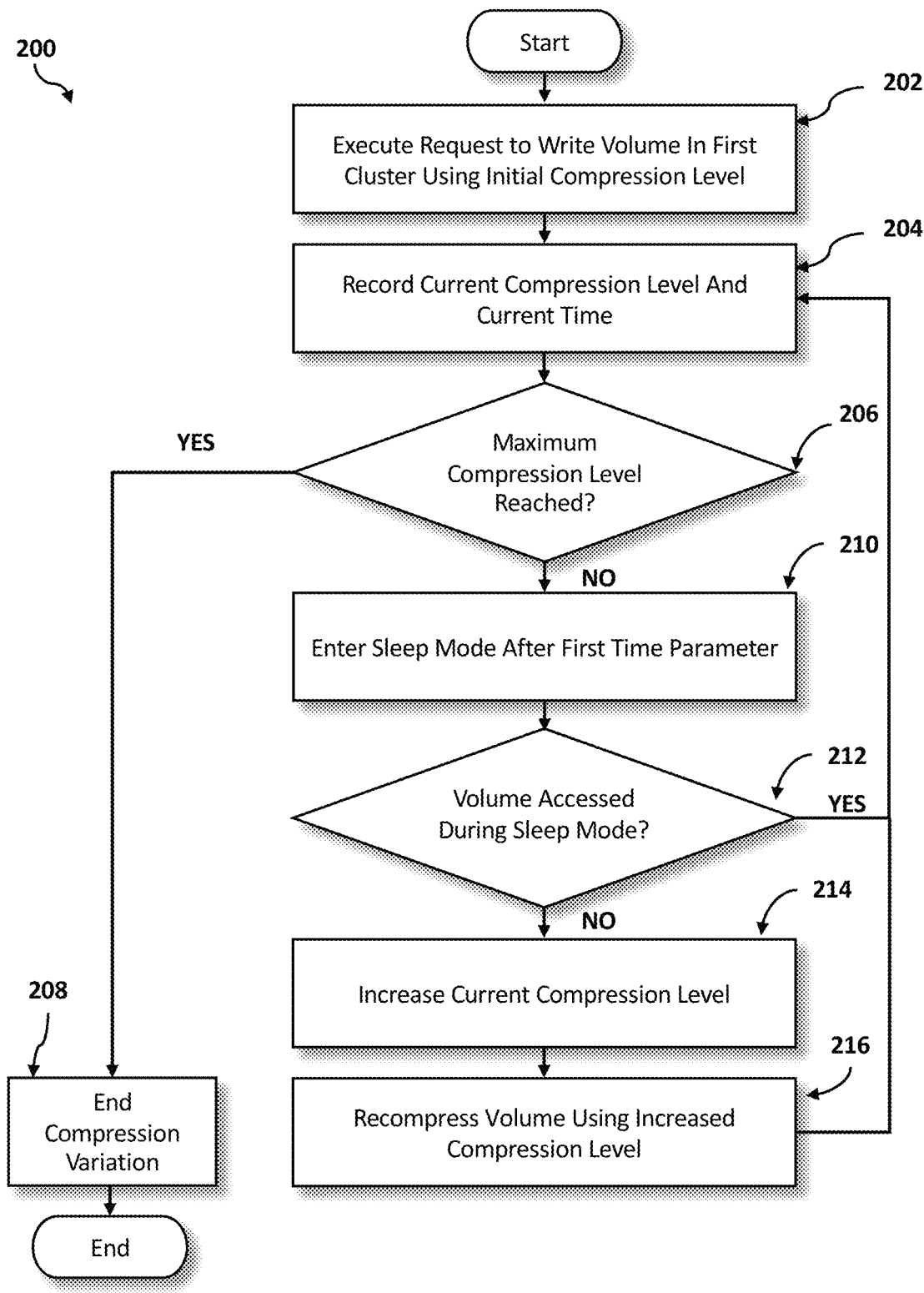
FIG. 2 is an operational flowchart illustrating a process for writing data from a host computer to a first cluster according to at least one embodiment.

Referring now to FIG. 2, an operational flowchart illustrating an exemplary write-compression process 200 for writing data from a host computer to a first cluster used by the storage virtualization program 110a and 110b according to at least one embodiment is depicted.

At 202, a request to write a volume in a first cluster using an initial compression level is executed. In one embodiment, the storage virtualization program 110a, 110b may run on a host computer (e.g., client computer 102) as part of the operating system or as a separate application program. The storage virtualization program 110a, 110b may be implemented in the host computer to manage the transfer of data to a storage system of a VTS (e.g., server computer 112).

According to one embodiment, a user, via the host computer, may interact with a management interface of the storage virtualization program 110a, 110b to insert/create a virtual volume (i.e., volume) into a first cluster of the storage system. In one embodiment, the storage virtualization program 110a, 110b may provide the user with the option to select the number of volumes to create, a volume serial number (VOLSER) for each inserted volume, and the cluster that will own the volume.

In one embodiment, the host computer may create the volume in the first cluster of a production site of the storage system. Then, the host computer may transmit a request (e.g., input/output (I/O) request) e.g., via communication network 116, to write the volume (e.g., data) in the first cluster. The VTS associated with the first cluster may receive the write request from the host computer, and upon receiving the write request, the storage virtualization program 110a, 110b running on the VTS may execute the write request of the volume in the first cluster.

In one embodiment, the storage virtualization program 110a, 110b may include a compression module (e.g., compression algorithm) capable of data compression (i.e., generate compressed data which represents source data using fewest number of bits). In one embodiment, the compression module may implement data compression in multiple stages by using parameters of different compression levels and additionally or alternatively using another compression algorithm. According to one embodiment, the compression module may define a ten-stage compression algorithm, where compression level 1 may correspond to the lowest compression ratio, lowest processing (e.g., CPU) cost, and compression level 10 may correspond to the highest compression ratio, highest processing (e.g., CPU) cost. In at least another embodiment, the compression module may define a compression algorithm having any suitable number of stages.

The storage virtualization program 110a, 110b may implement an initial compression level when executing the request to write the volume in the first cluster. In one embodiment, the storage virtualization program 110a, 110b may automatically adopt the lowest compression ratio (e.g., compression level 1) as the initial compression level. In at least one embodiment, the storage virtualization program 110a, 110b may provide the user with the option to define the initial compression level. The host computer may transmit (e.g., via communication network 116) the volume to the VTS as uncompressed data (e.g., source data). Then, the storage virtualization program 110a, 110b may implement the compression module to write the volume in a storage device in the first cluster (e.g., database 114 of server computer 112) using the initial compression level.

For example, a user interacts with the host computer and creates a new volume using the management interface of the storage virtualization program 110a, 110b. The user creates the volume in the first cluster (cluster_1) of the production site of the storage system. The host computer transmits, via communication network 116, a I/O request to write the volume in cluster_1. The volume is transmitted to the VTS associated with cluster_1 as uncompressed data. The storage virtualization program 110a, 110b running on the VTS implements the compression module to compress the volume using the initial compression level. Specifically, the compression module applies a first compression level (comp_level_1) of a ten-stage compression algorithm to compress the volume. Then, the storage virtualization program 110a, 110b running on the VTS executes the write request and stores the volume, compressed using comp_level_1, in the storage device of cluster_1.

Then at 204, the current compression level and current time are recorded. In one embodiment, the storage virtualization program 110a, 110b may record the current compression level and the current time in a storage device of the host computer and/or the storage device of the VTS. According to one embodiment, the current compression level may be defined by the current compression level "n" applied to the volume (e.g., n=comp_level_1). In one embodiment, the current time "t_prev" may be defined as a point-in-time at 204. The current time "t_prev" may be reflected by a local time zone and may use a 24-hour clock or a 12-hour clock.

Continuing with the previous example, the storage virtualization program 110a, 110b assigns the current compression level as "n=comp_level_1" corresponding to the compression level of the volume in cluster_1. The storage virtualization program 110a, 110b implements a 12-hour clock and assigns, according to the local time zone, the current time as "t_prev=12:30 AM". Then, the storage virtualization program 110a, 110b stores the current compression level and the current time in the storage device of the VTS.

Thereafter at 206, the storage virtualization program 110a, 110b determines if a maximum compression level is reached. As previously described, the compression module of the storage virtualization program 110a, 110b may define a multi-stage compression algorithm (e.g., ten-stage compression algorithm, where compression level 1 may correspond to the lowest compression ratio and compression level 10 may correspond to the highest compression ratio).

If at 206, the storage virtualization program 110a, 110b determines that the current compression level "n" applied to the volume is the highest compression level in the range of the multi-stage compression algorithm (e.g., "n==comp_level_10"), then the storage virtualization program 110a, 110b ends the compression variation at 208. At 208, the volume may be placed or maintained in the maximum-compressed state (e.g., highest compression level, highest compression ratio).

However, if, at 206, the storage virtualization program 110a, 110b determines that the current compression level "n" applied to the volume is not the highest compression level in the range of the multi-stage compression algorithm (e.g., "n==comp_level_1"), then the storage virtualization program 110a, 110b proceeds to 210.

Continuing with the previous example, the storage virtualization program 110a, 110b determines that the current compression level applied to the volume is "n==comp_level_1" which is not "n==comp_level_10". As such, the storage virtualization program 110a, 110b determines that the maximum compression level for the volume is not reached.

Then at 210, sleep mode is entered after a first time parameter. The storage virtualization program 110a, 110b may transition the write-compression process 200 (e.g., compression control thread) from an active mode to a sleep mode (e.g., first or write-compression cycle) after the lapse of a predetermined period of time or first time parameter "T_1". According to one embodiment, the first time parameter "T_1" may define a sleep time of the first cluster in the production site. The first time parameter "T_1" may be specified by the storage virtualization program 110a, 110b and/or by the user. In one embodiment, the first time parameter "T_1" may include a value ranging from several hours to several days.

Continuing with the previous example, the storage virtualization program 110a, 110b assigns a value of five hours to the first time parameter "T_1". Thus, after the lapse of five hours from "t_prev=12:30 AM", the storage virtualization program 110a, 110b transitions the compression control thread from the active mode to sleep mode at 5:30 AM.

Thereafter at 212, the storage virtualization program 110a, 110b determines if the volume was accessed during the sleep mode. According to one embodiment, the storage virtualization program 110a, 110b may include a background process (e.g., volume access thread) to monitor volume access from the host computer. The volume access thread may detect a point-in-time when the volume is accessed by the user interacting with the host computer and may record or update the value (e.g., "last_access_time") in the VTS.

According to one embodiment, the storage virtualization program 110a, 110b may check the "last_access_time" of the volume at regular intervals, which may correspond to the write-compression cycle of the first cluster. After the compression control thread enters the sleep mode, the storage virtualization program 110a, 110b may implement the volume access thread to check if the volume is accessed from the host computer. In one embodiment, the storage virtualization program 110a, 110b may compare the time recorded in "t_prev" against the time recorded in "last_access_time" to check if "t_prev" is greater than (e.g., more recent in time) "last_access_time".

If at 212, the storage virtualization program 110a, 110b determines that "last_access_time" is greater than (e.g., more recent in time) "t_prev", the storage virtualization program 110a, 110b determines that the host computer accessed the volume stored in the VTS (e.g., of the first cluster) during the sleep mode of the compression control thread. In response, the storage virtualization program 110a, 110b returns to 204 to record the current compression level and update the current time.

However, if at 212, the storage virtualization program 110a, 110b determines that "last_access_time" is less than (e.g., less recent in time) "t_prev", the storage virtualization program 110a, 110b determines that the host computer did not access the volume stored in the VTS (e.g., of the first cluster) during the sleep mode of the compression control thread. As such, the storage virtualization program 110a, 110b proceeds to increase the current compression level at 214.

Continuing with the previous example, the user interacts with the host computer to access the volume stored in the first cluster at 6:00 AM. The volume access thread detects that the volume stored in the first cluster is accessed from the host computer and updates the "last_access_time" to 6:00 AM. The storage virtualization program 110a, 110b stores "last-access_time=6:00 AM" in the VTS of the first cluster. Thereafter, the storage virtualization program 110a, 110b compares the time recorded in "t_prev" against the time recorded in "last_access_time" and determines that "last_access_time=6:00 AM" is greater than "t_prev=12:30 AM". As such, the storage virtualization program 110a, 110b determines that the host computer accessed the volume stored in the VTS of the first cluster during the sleep mode of the compression control thread. In response, the storage virtualization program 110a, 110b returns to 204 to record the current compression level, which remains "n=comp_level_1" and updates the current time to "t_prev=6:00 AM".

If the storage virtualization program 110a, 110b determines that the volume is not accessed during the sleep mode at 212, then the current compression level is increased at 214. According to one embodiment, the compression module of the storage virtualization program 110a, 110b may increment the compression level "n" by one compression level (e.g., "n++") to the next highest compression level. In another embodiment, the storage virtualization program 110a, 110b may provide the user with the option (e.g., via the management interface) to define an increment value for the compression level "n".

Continuing with the previous example, the compression module of the storage virtualization program 110a, 110b increments the current compression level "n=comp_level_1" by one compression level to "n=comp_level_2".

Then at 216, the volume is recompressed using the increased compression level. According to one embodiment, the storage virtualization program 110a, 110b may include a decompression module corresponding to the compression module described above. Before the volume may be recompressed using the increased compression level, the storage virtualization program 110a, 110b may implement the decompression module to reverse the data compression applied by the compression module. In one embodiment, the decompression module may decompress the compressed volume by one compression level before recompressing the volume using the increased compression level. In another embodiment, the decompression module may decompress the compressed volume in full before recompressing the volume using the increased compression level. Once the volume is decompressed, the storage virtualization program 110a, 110b may implement the compression module to recompress the volume using the increased compression level set at 214. Next, the storage virtualization program 110a, 110b may write the recompressed volume in the first cluster. Thereafter, the storage virtualization program 110a, 110b may return to 204 to record the current compression level "n" as the increased compression level (e.g., "n=comp_level_2") is applied to the recompressed volume and update the current time "t_prev".

Continuing with the previous example, the storage virtualization program 110a, 110b may implement the decompression module to reverse the "n=comp_level_1" data compression applied to the volume at 202. Then, the storage virtualization program 110a, 110b implements the compression module to recompress the volume using the increased compression level "n=comp_level_2" set at 214. Next, the storage virtualization program 110a, 110b writes the recompressed volume in the first cluster and returns to 204 to update the current compression level "n" of the recompressed volume and the current time "t_prev".

Figure 3:
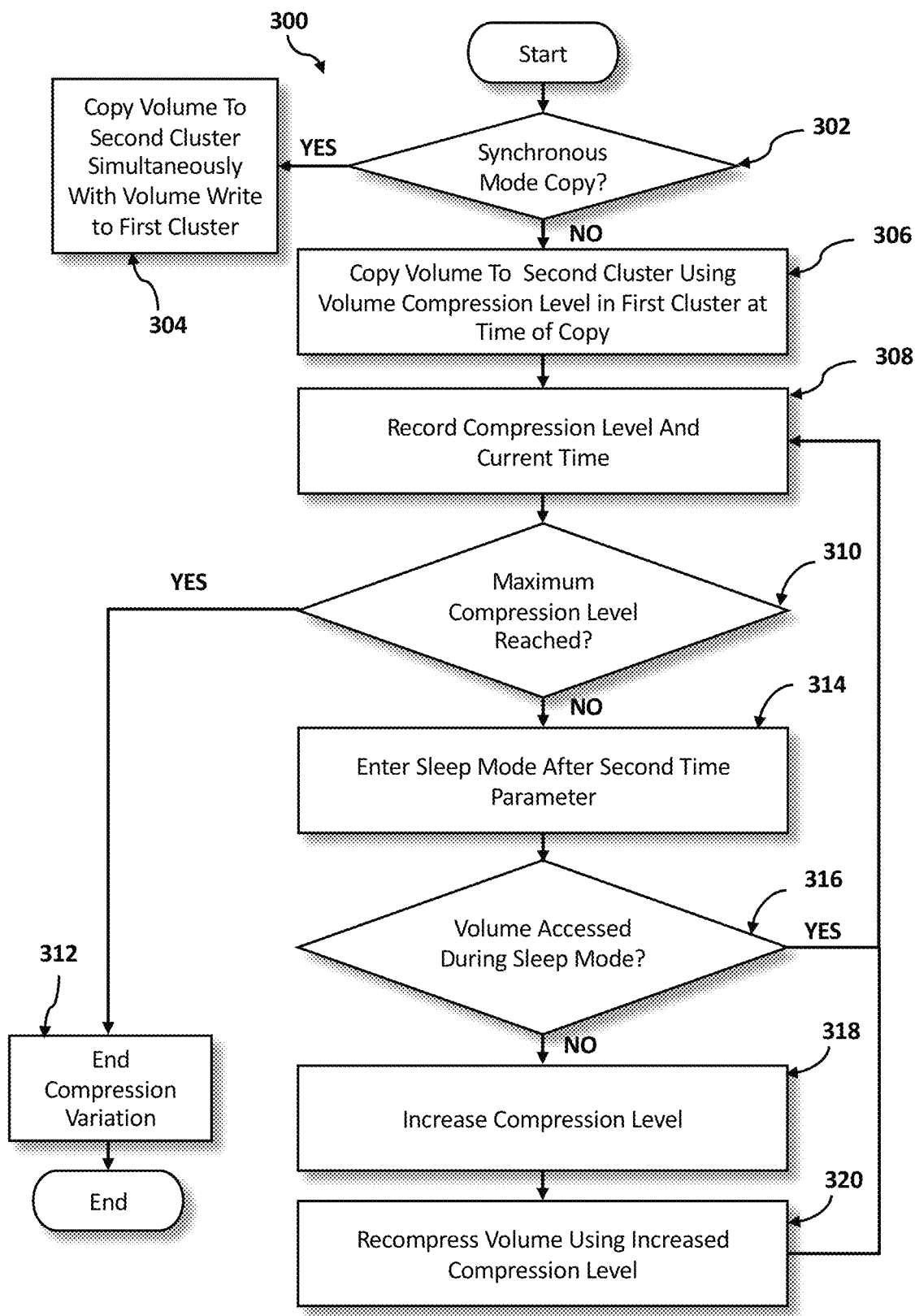
FIG. 3 is an operational flowchart illustrating a process for changing the compression level of data copied from the first cluster to a second cluster according to at least one embodiment.

Referring now to FIG. 3, an operational flowchart illustrating an exemplary copy-compression process 300 for changing the compression level of data copied from the first cluster to a second cluster used by the storage virtualization program 110a and 110b according to at least one embodiment is depicted.

According to one embodiment, the volume written to the first cluster may be replicated to another cluster in accordance with a copy policy set by the user. The management interface of the storage virtualization program 110a, 110b may provide the user with the option to select the copy policy on a per-cluster basis. In one embodiment, the user may select from the following copy policies: synchronous mode copy; immediate mode copy; deferred mode copy; and time-delayed mode copy, which differ in the timing of the copy performance.

At 302, the storage virtualization program 110a, 110b determines if synchronous mode copy is selected. Synchronous mode copy may replicate all compressed writes to a second cluster. In one embodiment, writes may be made simultaneously for two clusters. In another embodiment, writes may be made consecutively for two clusters.

If at 302, the storage virtualization program 110a, 110b determines that the user assigned the synchronous mode copy policy to the second cluster, then at 304, the volume is copied to the second cluster simultaneously with the volume write to the first cluster. In one embodiment, the copy-compression process 300 for synchronous mode copy may follow the write-compression process 200 illustrated in FIG. 2. Thus, the compression level of the volume copied to the second cluster may be the same as the compression level of the volume written to the first cluster.

However, if at 302, the storage virtualization program 110a, 110b determines that the user did not assign the synchronous mode copy policy to the second cluster, then at 306, the volume is copied to the second cluster using the volume compression level in the first cluster at the time of the copy. In at least one embodiment, the user may assign an immediate mode copy, deferred mode copy, or time-delayed mode copy policy to the second cluster.

According to one embodiment, the immediate mode copy may be performed after the writing of the volume is completed and before the volume is demounted by the host computer. According to one embodiment, the deferred mode copy may be performed based on an internal schedule, for example, when the copy of the volume is queued, and the turn comes after the volume demount process. According to one embodiment, the time-delayed mode copy may be performed after the lapse of a predetermined period of time (e.g., delay time) since the volume demount process. In one embodiment, the delay time may be clocked from the volume creation time or the volume last accessed time. The delay time may be specified by the user via the management interface of the storage virtualization program 110*a*, 110*b* or may be set to a default by the storage virtualization program 110*a*, 110*b*.

If immediate mode copy, deferred mode copy, or time-delayed mode copy is selected by the user, the storage virtualization program 110*a*, 110*b* may initiate the copy of the volume to the second cluster at or after 204 of the write-compression process 200. That is, the copy may be initiated after the storage virtualization program 110*a*, 110*b* records the compression level "n" applied to the volume written in the first cluster. Thus, the initial compression level "k" applied to the volume copied to the second cluster may correspond to the compression level "n" applied to the volume written to the first cluster at the time when the volume is copied to the second cluster.

For example, the compression level "n" of the volume written to the first cluster is "n=comp_level_3". Therefore, the storage virtualization program 110*a*, 110*b* implements the compression module to apply compression level "k=comp_level_3" to the volume when the volume is copied to the second cluster.

According to one embodiment, when the storage virtualization program 110*a*, 110*b* copies the volume to the second cluster, the copy-compression process 300 may proceed in a same or similar manner (e.g., with respect to steps 308, 310, 312, 316, 318, and 320) as the write-compression process 200 performed in the first cluster. However, the copy-compression process 300 may differ from the write-compression process 200 with respect to step 306 as described above (e.g., initial compression level "k" applied to the volume copied to the second cluster may correspond to the compression level "n" applied to the volume written to the first cluster at the time when the volume is copied to the second cluster) and with respect to step 314 as described below.

At 314, sleep mode is entered after a second time parameter. The storage virtualization program 110*a*, 110*b* may transition the copy-compression process 300 (e.g., compression control thread) from an active mode to a sleep mode (e.g., second or copy-compression cycle) after the lapse of a predetermined period of time or second time parameter "T_2". According to one embodiment, the second time parameter "T_2" may define a sleep time of the second cluster. In one embodiment, if the second cluster belongs to a production site (e.g., similar to the first cluster), the second time parameter "T_2" may be the same as the first time parameter "T_1". However, if the second cluster belongs to a disaster recovery site, then the storage virtualization program 110*a*, 110*b* may assign a time value that is less than the first time parameter "T_1".

Similar to the process at 212, the storage virtualization program 110*a*, 110*b* may check the "last_access_time" of the volume at regular intervals at 316, which may correspond to the copy-compression cycle of the second cluster. Since the second time parameter "T_2" is shorter than the first time parameter "T_1", the copy-compression cycle of the second cluster may be shorter than the write-compression cycle of the first cluster. Therefore, the regular intervals during which the "last_access_time" of the volume in the second cluster may be checked may be more frequent than the regular intervals during which the "last_access_time" of the volume in the first cluster may be checked. During each regular interval check, if the volume is found to not be accessed, the storage virtualization program 110*a*, 110*b* may recompress the volume with an increased compression level. Accordingly, the compression level of the volume copied to the disaster recovery site (e.g., second cluster) may approach the maximum compression level more quickly when compared to the volume in the production site.

By implementing the write-compression process 200 and the copy-compression process 300, the volume may be written in the production site using a low compression ratio such that less computing resources may be needed to compress and decompress the volume. As a result, the host computer may perform faster access to the volume stored in the production site. In the disaster recovery site, where storage efficiency may be more important than fast access to the volume from the host computer, the volume may be stored using a high compression ratio.

According to another embodiment, the storage virtualization program 110*a*, 110*b* may accelerate the increase of the compression ratio in the disaster recovery site and decelerate the increase of the compression ratio in the production site. Specifically, the storage virtualization program 110*a*, 110*b* may implement, on a per-cluster basis, a timing at which the compression level may be increased (e.g., at 214 of write-compression process 200 and at 318 of copy-compression process 300). For example, the storage virtualization program 110*a*, 110*b* may implement a schedule to increase the compression level of the volume in the production site every month (until the maximum compression level is reached) and may implement a schedule to increase the compression level of the volume in the disaster recovery site every week (until the maximum compression level is reached).

According to yet another embodiment, the storage virtualization program 110*a*, 110*b* may directly adopt the highest compression level for the volume stored in the disaster recovery site. The storage virtualization program 110*a*, 110*b* may apply the highest compression level to the volume before (e.g., immediately before) or after (e.g., immediately after) the volume is copied from the production site to the disaster recovery site. For example, the storage virtualization program 110*a*, 110*b* may perform the copy of the volume from the first cluster to the second cluster using compression level "n=comp_level_10" from the start.

The functionality of a computer may be improved by the storage virtualization program 110*a*, 110*b* because the computer may automatically change the compression level of a stored volume based on the objective (e.g., access speed, storage efficiency) of the cluster storing the volume. By implementing the storage virtualization program 110*a*, 110*b*, the computer may shift the compression ratio of a volume stored in the production site from a lower compression ratio to a higher compression ratio at a slower rate. On the other hand, the storage virtualization program 110*a*, 110*b* may enable the computer to shift the compression ratio of a volume stored in the disaster recovery site from a lower compression ratio to a higher compression ratio at a faster rate. Thus, the storage virtualization program 110*a*, 110*b* may enable the volume in the production site to be accessed faster, due to a lower compression ratio, while the storage space in the disaster recovery site may be used more efficiently by adopting a higher compression ratio.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
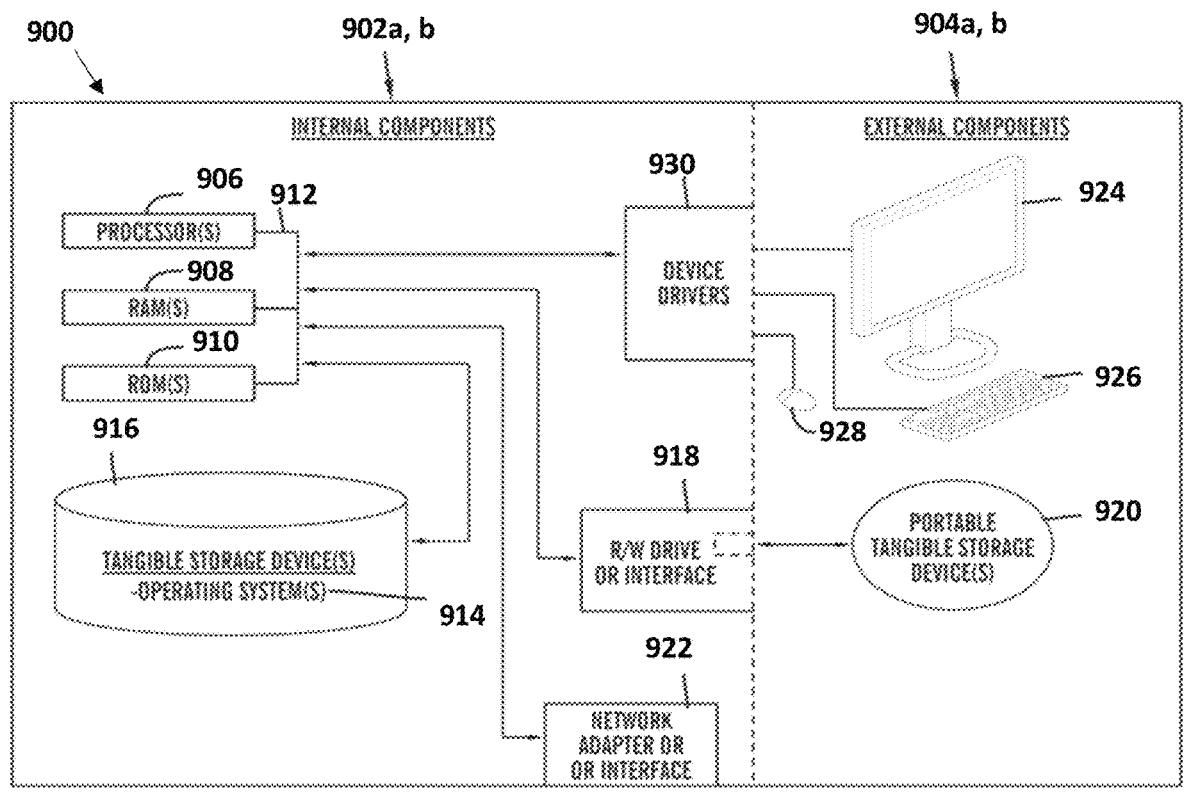
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the storage virtualization program 110a in client computer 102, and the storage virtualization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the storage virtualization program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the storage virtualization program 110a in client computer 102 and the storage virtualization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the storage virtualization program 110a in client computer 102 and the storage virtualization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
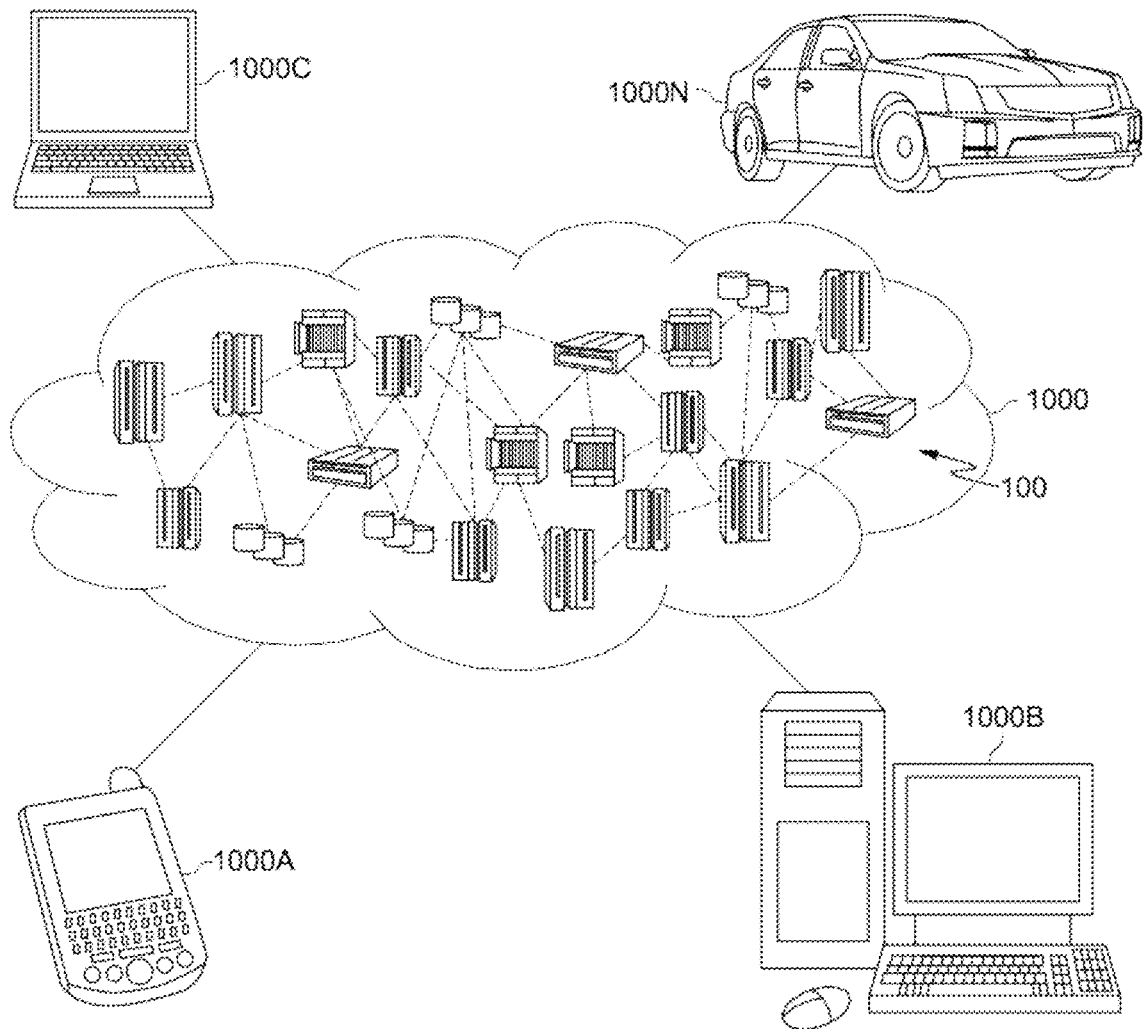
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
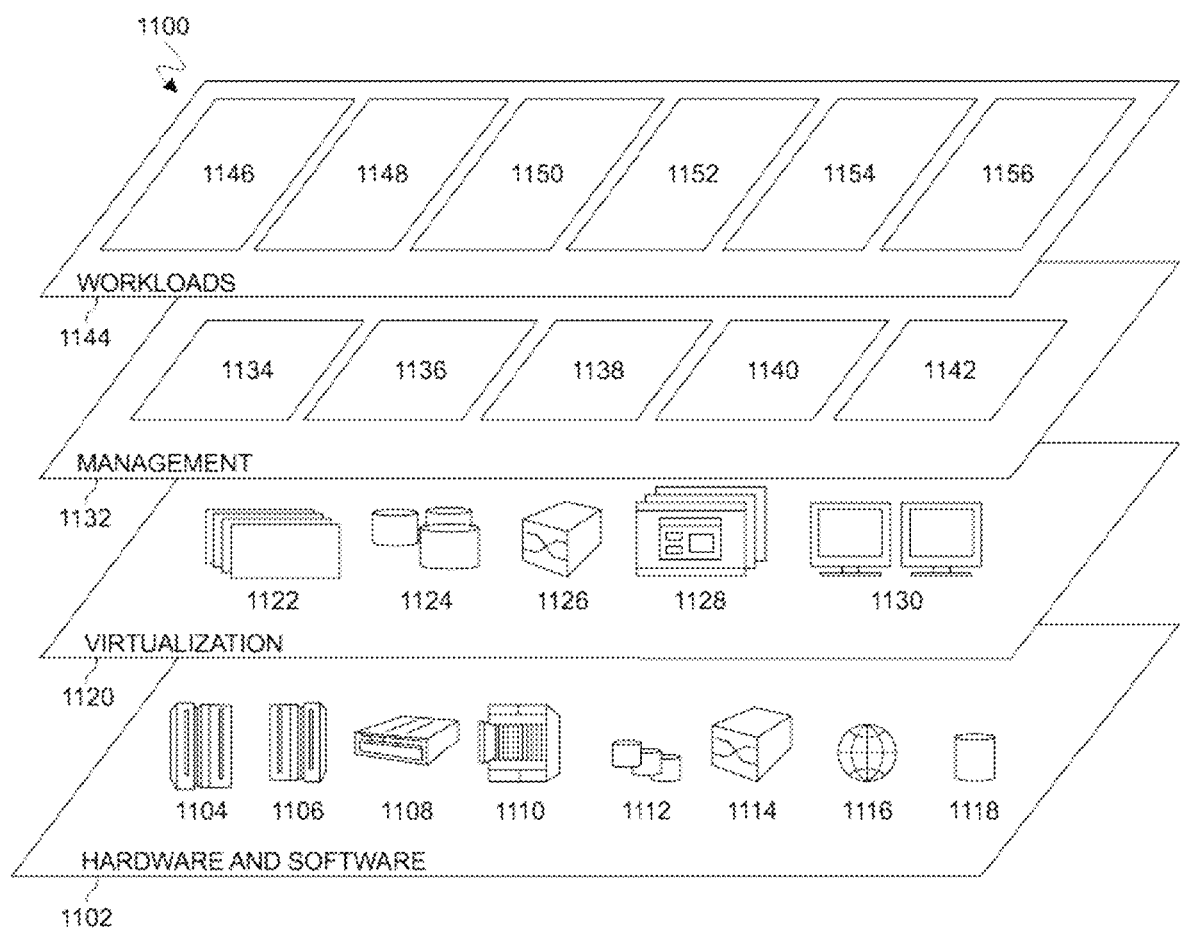
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and compression processing 1156. A storage virtualization program 110a, 110b provides a way to detect the access frequency of a stored volume and automatically provide a less accessed volume with a high compression level and automatically provide a more accessed volume with a lower compression level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing a volume in a storage device, wherein the stored volume is compressed using an initial compression level;
   transitioning a compression control thread associated with the stored volume from an active mode to a sleep mode based on satisfying a first time parameter;
   checking a last access time of the stored volume in the storage device at a regular interval during the sleep mode of the transitioned compression control thread, wherein the checked last access time of the stored volume in a disaster recovery site is performed more frequently compared to the checked last access time of the stored volume in a production site; and
   in response to determining, based on the checked last access time, that the stored volume is not accessed at the regular interval during the sleep mode of the transitioned compression control thread, recompressing the stored volume in the storage device using a higher compression level, wherein the higher compression level includes a higher compression ratio than a compression ratio associated with the initial compression level.

2. The method of claim 1, wherein storing the volume in the storage device, wherein the stored volume is compressed using the initial compression level, further comprises:
   writing the volume in a first cluster; and
   copying the written volume from the first cluster to a second cluster, wherein the initial compression level of the copied volume corresponds to a volume compression level of the written volume in the first cluster at a time of copy performance.

3. The method of claim 1, further comprising:
   setting a multi-stage compression process for the stored volume; and
   selecting a first compression level of the multi-stage compression process as the initial compression level for the stored volume.

4. The method of claim 3, wherein recompressing the stored volume in the storage device using the higher compression level, further comprises:
   decompressing the stored volume from the first compression level; and
   recompressing the stored volume using a second compression level of the multi-stage compression process, wherein the second compression level is a one-level higher compression ratio.

5. The method of claim 1, further comprising:
   setting a first compression cycle associated with writing the stored volume to a production site; and
   setting a second compression cycle associated with copying the stored volume to a disaster recovery site, wherein the set first compression cycle of the production site is longer than the set second compression cycle of the disaster recovery site.

6. The method of claim 5, further comprising:
   in response to the set first compression cycle of the production site being longer than the set second compression cycle of the disaster recovery site, checking the last access time of the stored volume in the production site at a first frequency and checking the last access time of the stored volume in the disaster recovery site at a second frequency, wherein the second frequency associated with the disaster recovery site is greater than the first frequency associated with the production site.

7. A computer system for objective-based compression level change, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   storing a volume in a storage device, wherein the stored volume is compressed using an initial compression level;
   transitioning a compression control thread associated with the stored volume from an active mode to a sleep mode based on satisfying a first time parameter;
   checking a last access time of the stored volume in the storage device at a regular interval during the sleep mode of the transitioned compression control thread, wherein the checked last access time of the stored volume in a disaster recovery site is performed more frequently compared to the checked last access time of the stored volume in a production site; and
   in response to determining, based on the checked last access time, that the stored volume is not accessed at the regular interval during the sleep mode of the transitioned compression control thread, recompressing the stored volume in the storage device using a higher compression level, wherein the higher compression level includes a higher compression ratio than a compression ratio associated with the initial compression level.

8. The computer system of claim 7, wherein storing the volume in the storage device, wherein the stored volume is compressed using the initial compression level, further comprises:
   writing the volume in a first cluster; and
   copying the written volume from the first cluster to a second cluster, wherein the initial compression level of the copied volume corresponds to a volume compression level of the written volume in the first cluster at a time of copy performance.

9. The computer system of claim 7, further comprising:
   setting a multi-stage compression process for the stored volume; and
   selecting a first compression level of the multi-stage compression process as the initial compression level for the stored volume.

10. The computer system of claim 9, wherein recompressing the stored volume in the storage device using the higher compression level, further comprises:

decompressing the stored volume from the first compression level; and recompressing the stored volume using a second compression level of the multi-stage compression process, wherein the second compression level is a one-level higher compression ratio.

11. The computer system of claim 7, further comprising:

setting a first compression cycle associated with writing the stored volume to a production site; and setting a second compression cycle associated with copying the stored volume to a disaster recovery site, wherein the set first compression cycle of the production site is longer than the set second compression cycle of the disaster recovery site.

12. The computer system of claim 11, further comprising:

in response to the set first compression cycle of the production site being longer than the set second compression cycle of the disaster recovery site, checking the last access time of the stored volume in the production site at a first frequency and checking the last access time of the stored volume in the disaster recovery site at a second frequency, wherein the second frequency associated with the disaster recovery site is greater than the first frequency associated with the production site.

13. A computer program product for objective-based compression level change, the computer program product comprising a computer readable storage medium having program instructions embodied therewith, the program instructions executable by a processor to cause the processor to:

storing a volume in a storage device, wherein the stored volume is compressed using an initial compression level;

transitioning a compression control thread associated with the stored volume from an active mode to a sleep mode based on satisfying a first time parameter;

checking a last access time of the stored volume in the storage device at a regular interval during the sleep mode of the transitioned compression control thread, wherein the checked last access time of the stored volume in a disaster recovery site is performed more frequently compared to the checked last access time of the stored volume in a production site; and in response to determining, based on the checked last access time, that the stored volume is not accessed at the regular interval during the sleep mode of the transitioned compression control thread, recompressing the stored volume in the storage device using a higher compression level, wherein the higher compression level includes a higher compression ratio than a compression ratio associated with the initial compression level.

14. The computer program product of claim 13, wherein storing the volume in the storage device, wherein the stored volume is compressed using the initial compression level, further comprises:

writing the volume in a first cluster; and copying the written volume from the first cluster to a second cluster, wherein the initial compression level of the copied volume corresponds to a volume compression level of the written volume in the first cluster at a time of copy performance.

15. The computer program product of claim 13, further comprising:

setting a multi-stage compression process for the stored volume; and selecting a first compression level of the multi-stage compression process as the initial compression level for the stored volume.

16. The computer program product of claim 15, wherein recompressing the stored volume in the storage device using the higher compression level, further comprises:

decompressing the stored volume from the first compression level; and recompressing the stored volume using a second compression level of the multi-stage compression process, wherein the second compression level is a one-level higher compression ratio.

17. The computer program product of claim 13, further comprising:

setting a first compression cycle associated with writing the stored volume to a production site; and setting a second compression cycle associated with copying the stored volume to a disaster recovery site, wherein the set first compression cycle of the production site is longer than the set second compression cycle of the disaster recovery site.

* * * * *